United States Patent [19]

Hosbach et al.

[11] Patent Number: 5,292,199
[45] Date of Patent: Mar. 8, 1994

[54] AXLE WHEEL SEAL AND BEARING ARRANGEMENT FOR A MOTOR VEHICLE

[75] Inventors: John H. Hosbach; Binod K. Agrawal, both of Rochester Hills; Harold L. Chambers, Clinton Township, Macomb County, all of Mich.

[73] Assignee: Ford Motor Company, Dearborn, Mich.

[21] Appl. No.: 57,917

[22] Filed: May 7, 1993

[51] Int. Cl.⁵ .......................... F16C 33/78; F16J 15/34
[52] U.S. Cl. ..................... 384/478; 277/35; 384/486
[58] Field of Search .............. 277/35, 37, 25, 153, 277/188 R; 384/478, 484, 486

[56] References Cited

U.S. PATENT DOCUMENTS

| | | | |
|---|---|---|---|
| 3,510,138 | 5/1970 | Bower et al. | 277/35 |
| 4,208,057 | 6/1980 | Messenger | 277/37 |
| 5,004,248 | 4/1991 | Messenger et al. | 277/37 |

*Primary Examiner*—Thomas R. Hannon
*Attorney, Agent, or Firm*—Frank G. McKenzie; Roger L. May

[57] ABSTRACT

A wheel bearing (42) located between the wheel hub 14 and axle spindle (10) is supplied with lubricant located in an annular cavity between the hub and spindle. A lubricant seal (52) is fitted with slight interference between the hub and seal and defines a sealing lip (72), which is urged by a garter spring (70) into contact with an inner sleeve (76) of the seal. A slinger (58) is supported by tabs (88) on a surface of the bearing and provides a radial planar ring surface (86) located between the bearing race and seal. On assembly, the slinger provides a stop surface that limits axial movement of the inner sleeve of the seal toward the bearing.

8 Claims, 2 Drawing Sheets

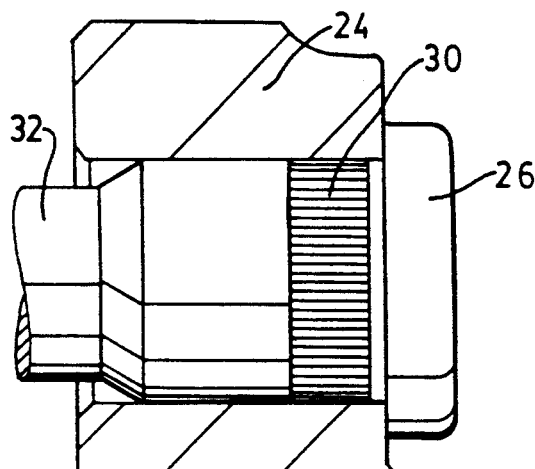
FIG-2
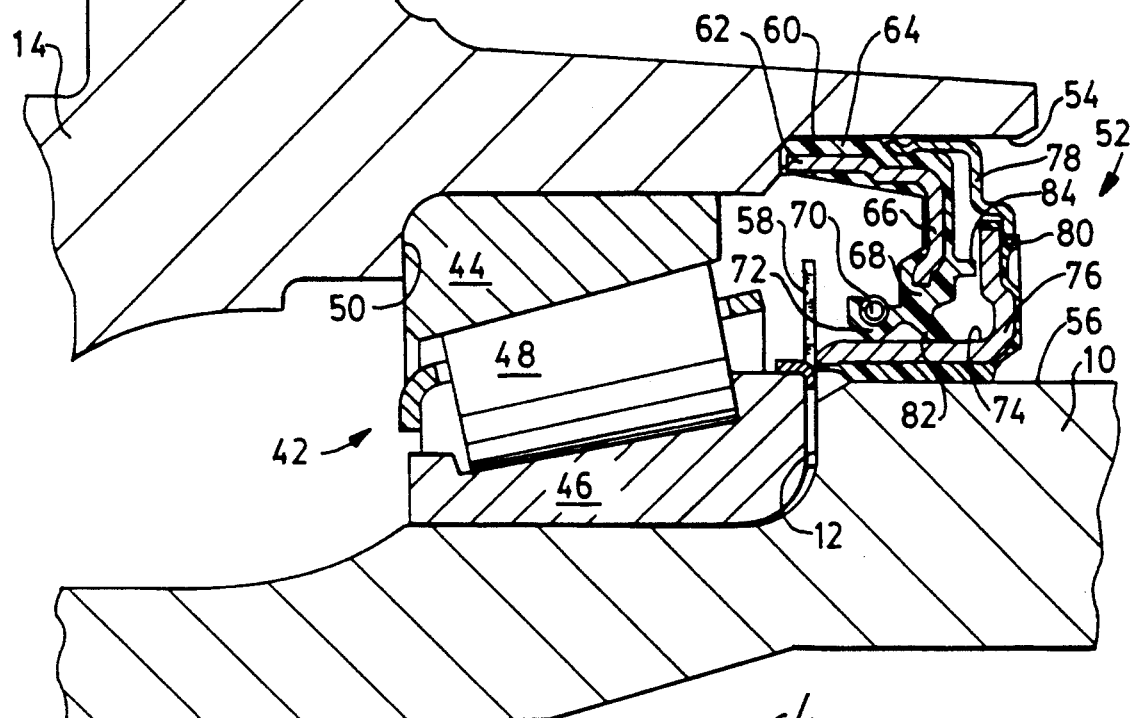
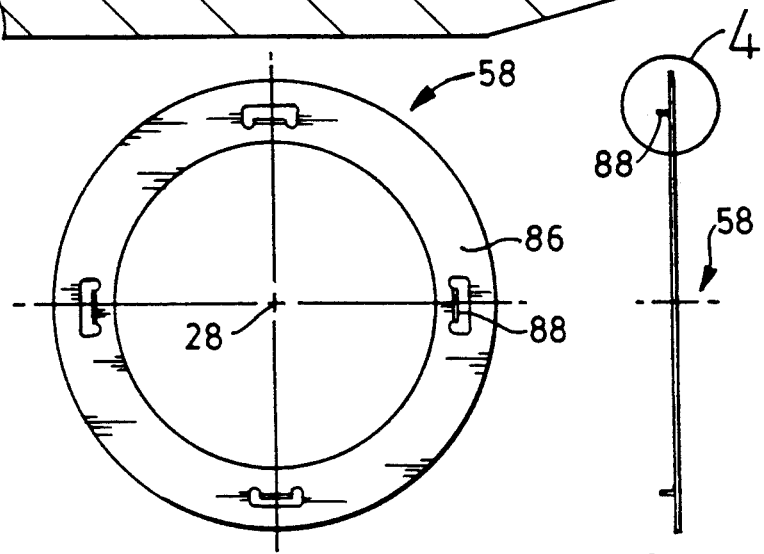
FIG-3
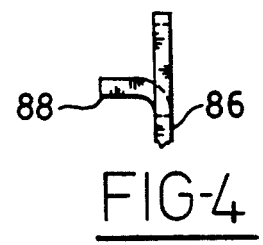
FIG-4
FIG-5

AXLE WHEEL SEAL AND BEARING ARRANGEMENT FOR A MOTOR VEHICLE

BACKGROUND OF THE INVENTION

1. FIELD OF THE INVENTION

This invention pertains to the field of wheel hubs and axles for motor vehicles. More particularly, the invention pertains to wheel bearings and lubricant seals used in combination with axles and wheel hubs.

2. DESCRIPTION OF THE PRIOR ART

Unitized seals, such as those used with a wheel bearing of a motor vehicle, generally include an outer sleeve, held by a slight interference on a first element, and an inner sleeve, also held by slight interference fit on a second element, the first and second elements supported for mutual relative rotation. The outer surface of the outer sleeve and the inner surface of the inner sleeve are generally covered with elastomeric material, which produces hydraulic sealing contact due to the interference fit on the first and second elements, respectively.

In order to provide a hydraulic seal that prevents movement of fluid, usually axle lubricant, through the seal between the inner and outer sleeves, a sealing lip formed of elastomer is forced resiliently by a garter spring into sealing contact with a surface of the inner sleeve. In addition, various sealing lips are formed integrally with the elastomer and held by the inherent elasticity of the elastomer in contact with the inner seal or outer seal. These lips prevent movement of contaminants through the seal and help preserve integrity of the axle lubricant.

A unitized seal of the this type includes also a bumper pad molded integrally with the elastomer and is supported rotatably on either the inner or outer sleeve. The bumper pad is generally located at a slight clearance from an inner surface of the other sleeve than the sleeve to which it is fixed.

Ideally upon installation of a unitized seal in the axle assembly, the bumper pad remains spaced from the sleeve, thereby preventing inward migration of contaminants entrained in the axle lubricant. The size of the clearance between the bumper pad and adjacent sleeve surface determines the size of contaminants that are filtered and excluded from entering the seal.

However, it has been discovered that as the sleeve is installed, frequently the clearance between the bumper pad and the adjacent sleeve surface is closed entirely and that the bumper pad is held instead in resilient contact with the sleeve contrary to its intended spacial relationship. Furthermore, the bumper pad and sleeve are in frictional contact with a force applied to the contact surface whose magnitude can be substantial depending on the conditions of assembly. As a result of this, it has been observed that relatively high in service temperatures are produced in the sleeve due to the preloaded contact and relative rotation between the bumper pad and sleeve.

SUMMARY OF THE INVENTION

It is an object of the present invention to eliminate frictional contact between an elastomeric surface of an unitized seal and a surface of a portion of the seal that rotates relative to the elastomer. During installation, inner and outer sleeves of the seal are moved axially along surfaces of the axle assembly with which the sleeves are in interference contact. If one sleeve is moved too far relative to the other sleeve, instead of a clearance being maintained between an elastomer pad within the seal and one of the sleeves, that clearance is removed entirely and replaced by preloaded contact, which is maintained by frictional contact of the sleeves on the surfaces with which they are engaged. Due to the elastic, resilient nature of the elastomer present in the unitized seal, the magnitude of the force that is maintained between the elastomer and sleeve can be fairly high.

To eliminate these difficulties in an assembly of an automotive vehicle axle that includes two components supported for relative rotation therebetween, such as an axle spindle and wheel hub, an anti-friction bearing is fitted between the axle spindle and wheel hub against shoulders provided to position the bearing correctly. A hydraulic seal for preventing passage of hydraulic fluid is located in the assembly adjacent the wheel bearing. The seal includes an outer sleeve, held in frictional contact on a member of the wheel assembly, and an inner seal, held in frictional contact on another member of the wheel assembly, the inner and outer sleeves of the seal being adapted to turn relative to one another.

A slinger, in the form of an annular ring having a substantially planar surface located between the wheel bearing and seal, includes tabs extending from the planar surface, angularly spaced about the axis of the axle and overlapping a surface of the wheel bearing. The ring portion of the slinger extends radially outward into a space located between the bearing and seal. The ring includes a portion that is fixed in position between a shoulder of one of the components of the wheel assembly and a race of the wheel bearing. One of the sleeves of a unitized hydraulic seal contacts a surface of the cylinder and limits movement of the seal sleeve axially toward the wheel bearing during the process of installation. The portion of the slinger that extends outward between the seal and bearing provides a baffle that limits or impedes flow of hydraulic fluid from the bearing toward the seal.

The slinger correctly positions the inner sleeve of the cartridge seal in the axial direction when the wheel hub and axle spindle are assembled. The slinger limits movement of the seal's inner sleeve toward a bumper pad within the unitized seal, prevents mutually loading the pad and sleeve, and maintains a clearance between the pad and sleeve.

An advantage of the assembly according to this invention is reduction of elevated temperatures in the seal due to preloaded frictional contact that normally is present in a unitized bearing when the bearing sleeves are permitted to move relative to one another axially sufficiently far to preload a bumper pad within the bearing. The presence of the preloaded bearing contact between the bumper pad and the bearing sleeve is not visually apparent to an operator who makes the assembly.

A second advantage is that metal flaking and wear that results due to movement of a hard bearing race against a relatively soft axial spindle is eliminated by use of the present invention. Particles of metal resulting from this wear are a source of premature seal failure. The slinger according to this invention, provides a hard interface between the bearing and the axle spindle, thereby eliminating wear on the spindle and need to harden the spindle material.

BRIEF DESCRIPTION OF THE FIGURES

FIG. 2 is a cross section of a portion of FIG. 1 in the vicinity of the inner wheel bearing and seal.

FIG. 3 is an front view of a wheel bearing oil slinger.

FIG. 4 is a detail in larger scale of the circled portion 4 of the slinger of FIG. 5.

FIG. 5 is a side view of the slinger of FIG. 3.

DESCRIPTION OF THE PREFERRED EMBODIMENT

Figure 1:
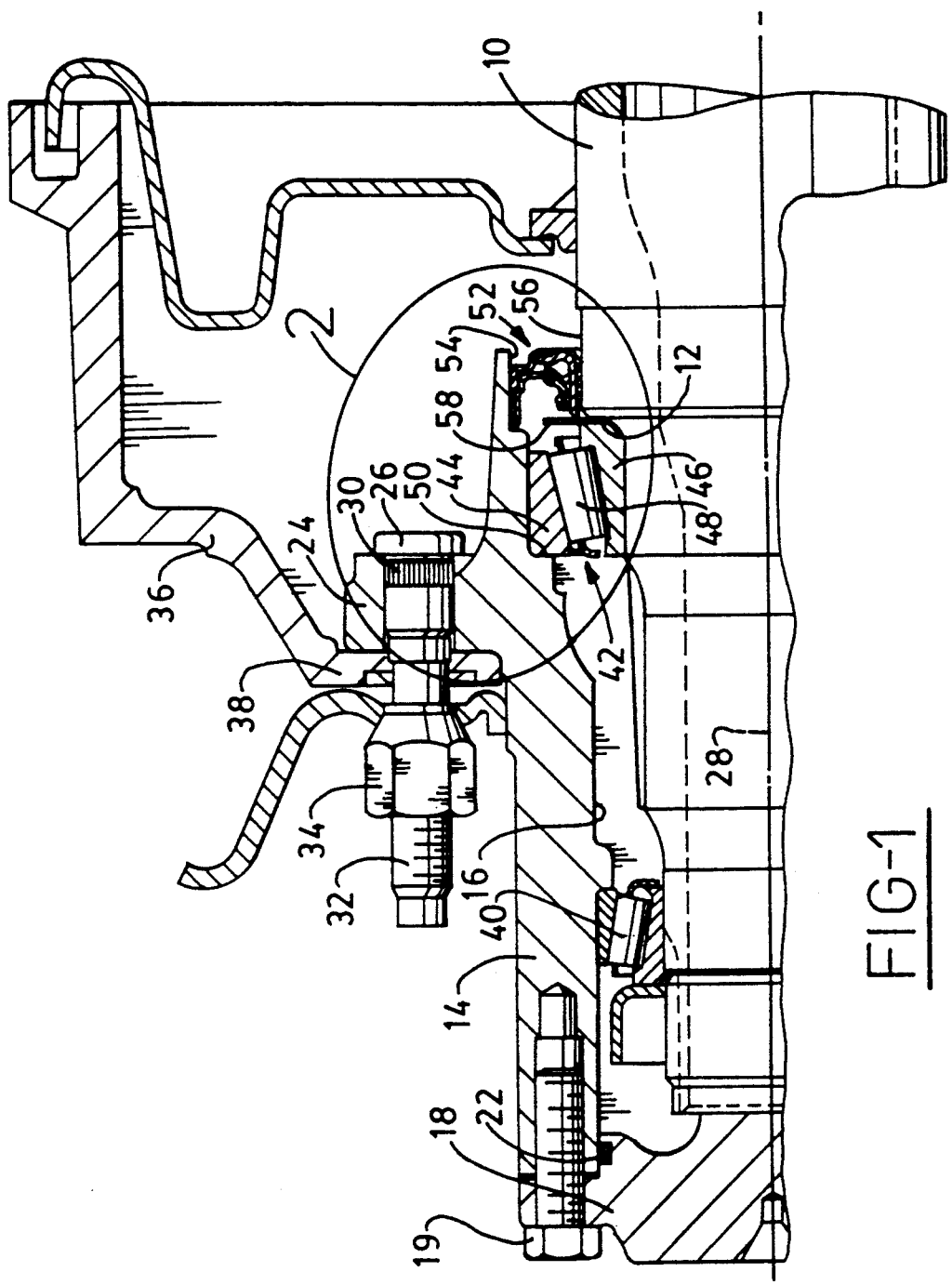
FIG. 1 is a cross section through an axle spindle and wheel hub to which the present invention can be applied.

Referring first to FIG. 1, the outboard end of a motor vehicle axle includes an axle spindle 10, a hollow shaft with stepped outer surface defining various shoulders including shoulder 12. The axle spindle extends partially within the bore of wheel hub 14. The end of the wheel hub bore 16 is closed by cap 18, fixed to the wheel hub by bolts 19 and sealed against the passage of hydraulic fluid by O-ring 22.

The wheel hub contains a radially directed flange 24, which supports lug bolts 26, spaced angularly about the axis 28 of the axle. The lug bolts are held against rotation on flange 26 by a spline connection 30 and include a threaded shank 32, which is engaged by a lug nut 34. The wheel 36 includes a flange 38, connected to the wheel hub driveably by engaging nut 34 on the threads of bolt 26.

The axle spindle 10 rotatably supports the wheel hub on an outer axle bearing 40 and an inner axle bearing 42. Bearing 42 includes an outer race 44, an inner race 46, and conical rollers 48 located between the inner race and outer race. The outer race bears against a shoulder 50 formed on the inner surface of wheel hub 14, and inner race 46 is located adjacent shoulder 12 formed on the outer surface of the wheel spindle 10. An hydraulic seal 52 is located interference between a radially inner surface 54 of the wheel hub and a radially outer surface 56 of the wheel spindle 10. The seal is sized to maintain a slight interference fit between surfaces 54 and 56. A slinger 58 is located between shoulder 12 and inner race 46 of bearing 42.

Referring now to FIG. 2, seal 52 includes an outboard sleeve 60 comprising a metal ring 62 surrounded by an elastomeric ring 64, ring 62 having a web 66 also surrounded by an elastomer 68. A garter spring 70 applies an inboard radially directed force to the seal 68 forcing contact of lip seal 72 against the radially outer surface 74 of an inner sleeve 76. Seal lip 72, urged by garter spring 70 into contact with surface 74, provides a hydraulic seal against the passage of lubricant and contaminants.

The outer sleeve also includes an outer ring 78, bonded to the outer surface of the elastomer 64 and extending radially inward providing a radial clearance above the outer surface of the elastomer 80, which surrounds the radially inner surface of the inner sleeve or ring 76.

The elastomer 68 is formed with a second sealing lip, dust lip 82, which prevents the passage of contaminants. The elastomer of seal 64 is formed also with a moulded pad 84 that extends axially toward the inner surface of inner ring 76 providing a small annular clearance therebetween, which clearance prevents the passage of large contaminants carried by the axle lubricant.

FIGS. 3-5 show in greater detail that slinger 58 is in the form of a circular ring 86 having four axially extending tabs 88 extending outward from the planar surface of ring 86 at angularly spaced locations about axis 28. The radially inner surface of tabs 88 rests on the outer surface of bearing race 46. Ring 86 is held in position between a shoulder 12 and bearing race 46 and extends radially outward to provide a stop surface against which ring 76, which forms a portion of the inner sleeve of bearing 52, makes contact. The slinger is made of ferritic nitro carbonitride having a hardness #58 and a minimum depth of 0.003 inches. The material of the slinger is SAEJ403 1008-1010 steel having a nominal thickness of 0.030 inches and a tolerance of +0.005-0.000 inches.

In operation, the angular space between wheel hub 14 and axle sleeve 10 contains hypoid gear oil, which passes through the inner wheel bearing 42 and lubricates the anti-friction surfaces. The purpose of seal 52 is to prevent lubricant from flowing past the seal. The presence of the slight interference fit between the outer sleeve 64 of the seal and surface 54 and between the inner sleeve 76 of the seal and surface 56 prevents lubricant flow along the surface of contact. Resilient contact between lip seal 72 of the seal 52 and surface 74 prevents lubricant flow through the seal.

As seen in FIG. 3, slinger 58 provides a baffle over which lubricant passing through bearing 42 must flow in order to reach seal 52. Slinger 58 provides a further implement to the flow of hydraulic fluid and reduces the possibility that lubricant can pass through seal 52.

The axle bearing 42 is put in place between shoulders 12 and 50 on the wheel hub and axle spindle, respectively. Then, the tabs of slinger 58 are located over the outer surface of bearing race 47 with a slight clearance fit, and the ring portion 86 of slinger 58 contacts the inner axial face of bearing race 46. The slinger 56 provides a limiting position for the inner sleeve 76 of seal 52 due to its contact with the outer end of ring 76. When the wheel hub 14 is assembled onto the axle spindle, the slinger limits movement of the inner sleeve 74 of the seal 52 axially outward and thereby assures the presence of a clearance between pad 84 and the outer radially-directed surface of ring 76 on the inner sleeve of seal 52.

The high running temperatures produced by frictional contact between pad 84 and the adjacent surface of ring 76 was a cause for premature seal failure. The bearing-seal assembly including the slinger of the present invention prevents frictional contact between pad 84 and ring 76 and prevents the possibility that high temperatures will be produced in the seal due to frictional contact.

We claim:

1. An assembly for an automotive vehicle axle, comprising:
    a first component;
    a second component adapted for rotation relative to the first component;
    a bearing located between the first component and second component, providing support for relative rotation therebetween;
    means for sealing a space between the first and second components against passage of fluid, having a first element contacting the first component, and second element contacting the second component, the first and second elements mutually axially displaceable and rotatable; and a slinger fixed against axial movement, having a surface located adjacent the seal for limiting movement of one of the first element and second element toward the bearing.

2. The assembly of claim 1 wherein:

the bearing has an inner race, outer race and bearing elements located between the inner race and outer race;

the first component defines a first shoulder, the second component defines a second shoulder spaced axially from, and facing the first shoulder, the outer race abuts the first shoulder, the inner race abuts the second shoulder; and the slinger is located between a bearing race and the corresponding abutting shoulder, thereby fixing the slinger against axial movement.

3. The assembly of claim 2 wherein the slinger includes:

a ring substantially coaxial with the first component and second component, extending radially adjacent one of the group consisting of the first element and second element; and tabs extending axially from the ring toward the bearing, spaced mutually about the axis of the ring, and located adjacent a surface of a bearing race.

4. The assembly of claim 1 wherein the slinger comprises:

a ring substantially coaxial with the first component and second component, extending radially adjacent one of the group consisting of the first element and second element; and tabs extending axially from the ring toward the bearing, spaced mutually about the axis of the ring, and located adjacent a surface of the bearing.

5. An assembly for an automotive vehicle axle, comprising:

a wheel hub;

an axle spindle adapted for rotation relative to the wheel hub;

a bearing located between the wheel hub and axle spindle, providing support for relative rotation therebetween;

means for sealing a space between the wheel hub and axle spindle against passage of fluid, having a radially outer sleeve frictionally contacting the wheel hub, a radially inner sleeve frictionally contacting the axle spindle, the inner and outer sleeves being mutually axially displaceable and rotatable; and a slinger fixed against axial movement, having a surface located adjacent the seal for limiting movement of one of the group consisting of the inner sleeve and the outer sleeve toward the bearing.

6. The assembly of claim 5 wherein the bearing has an inner race, outer race and bearing elements located between the inner race and outer race;

the wheel hub defines a first shoulder, the axle spindle defines a second shoulder spaced axially from, and facing the first shoulder, the outer race abuts the first shoulder, the inner race abuts the second shoulder; and the slinger is located between a bearing race and the corresponding abutting shoulder, thereby fixing the slinger against axial movement.

7. The assembly of claim 6 wherein the slinger includes:

a ring substantially coaxial with the wheel hub and axle sleeve, extending radially adjacent one of the group consisting of the inner sleeve and outer sleeve; and tabs extending axially from the ring toward the bearing, spaced mutually about the axis of the ring, and located adjacent a surface of a bearing race.

8. The assembly of claim 5 wherein the slinger comprises:

a ring substantially coaxial with the wheel hub and axle spindle, extending radially adjacent one of the group consisting of the inner sleeve and outer sleeve; and tabs extending axially from the ring toward the bearing, spaced mutually about the axis of the ring, and located adjacent a surface of the bearing.

* * * * *